United States Patent
Karaya

(10) Patent No.: US 11,010,218 B1
(45) Date of Patent: May 18, 2021

(54) DECLARATIVE STREAMLINING OF DEPENDENCY CONSUMPTION

(71) Applicant: SAP SE, Walldorf (DE)

(72) Inventor: Amshuman Rao Karaya, Kota (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/874,272

(22) Filed: May 14, 2020

(30) Foreign Application Priority Data

Apr. 2, 2020 (IN) .............................. 202011014683

(51) Int. Cl.
*G06F 3/00* (2006.01)
*G06F 9/54* (2006.01)
*G06F 9/50* (2006.01)
*G06F 8/60* (2018.01)

(52) U.S. Cl.
CPC ................ *G06F 9/547* (2013.01); *G06F 8/60* (2013.01); *G06F 9/5083* (2013.01)

(58) Field of Classification Search
CPC ..................................................... G06F 9/541
USPC ......................................................... 719/328
See application file for complete search history.

(56) References Cited

U.S. PATENT DOCUMENTS

| | | | | |
|---|---|---|---|---|
| 2012/0117144 A1* | 5/2012 | Douillet | ................ | H04L 67/288 709/203 |
| 2019/0065323 A1* | 2/2019 | Dhamdhere | ............ | G06F 9/455 |
| 2019/0146854 A1* | 5/2019 | Jones | ........................ | G06F 9/54 719/328 |
| 2020/0174842 A1* | 6/2020 | Wang | .................... | G06F 9/5072 |

OTHER PUBLICATIONS

Remo Scolati, A Containerized Big Data Streaming Architecture for Edge Cloud Computing on Clustered Single-board Devices. (Year: 2019).*
Evan Speight, An Integrated Shared-Memory / Message Passing API for Cluster-Based Multicomputing. (Year: 1998).*

* cited by examiner

*Primary Examiner* — Lechi Truong
(74) *Attorney, Agent, or Firm* — Buckley, Maschoff & Talwalkar LLC

(57) ABSTRACT

According to some embodiments, methods and systems may be associated with a consuming cluster where custom dependencies are exposed (e.g., a Kubernetes cluster deploying a workload) and an external service application programming interface where the custom dependencies are mapped. A dependency controller platform may be located between the consuming cluster and the external service application programming interface. Moreover, a computer processor of the dependency controller platform may receive information about an exposed consuming cluster custom dependency. The dependent controller platform may then map the received information to the appropriate external service application programming interface to declaratively streamline dependency consumption. Note that the external service application programming interface might be setup in the same Kubernetes cluster, in a workload hosted on a different Kubernetes cluster, as a managed service provided natively by a cloud provider, as an external cloud-native service (e.g., a database service), etc.

12 Claims, 16 Drawing Sheets apiVersion: rds.amazonaws.com/v4 kind: DBInstance metadata:

name: pg namespace: default spec:

Version: "2014-09-01"

DBInstanceClass: "db.t2.micro"

Engine: "postgres"

DBInstanceIdentifier: "rds-15"

AllocatedStorage: "15"

DECLARATIVE STREAMLINING OF DEPENDENCY CONSUMPTION

BACKGROUND

A container-orchestration system may help automate application deployment, scaling, and/or actively manage and operate an application throughout its full lifecycle. For example, Kubernetes (also referred to as "k8s") is one system that provides a platform for automating deployment, scaling, and/or operations of application containers across clusters of host machines (also known as nodes). As a result, cloud services may offer a Kubernetes-based Platform as a Service ("PaaS") or Infrastructure as a Service ("IaaS").

Most non-trivial applications have dependencies that they consume in various ways. Some such dependencies might be collocated in the same environment, infrastructure, and/or platform as the application while some other dependencies might be external to the applications hosting the environment, infrastructure, and/or platform.

It would therefore be desirable to provide for the declarative streamlining of dependency consumption in an automatic and efficient manner in such a way so as to provision, consume, de-provision, and/or actively manage and operate the application's dependencies throughout its lifecycle.

SUMMARY

According to some embodiments, methods and systems may be associated with a consuming cluster where custom dependencies are exposed (e.g., a Kubernetes cluster deploying a workload) and an external service application programming interface where the custom dependencies are mapped. A dependency controller platform may be located between the consuming cluster and the external service application programming interface. Moreover, a computer processor of the dependency controller platform may receive information about an exposed consuming cluster custom dependency. The dependent controller platform may then map the received information to the appropriate external service application programming interface to declaratively streamline dependency consumption. Note that the external service application programming interface might be setup in the same Kubernetes cluster, in a workload hosted on a different Kubernetes cluster, as a managed service provided natively by a cloud provider, as an external cloud-native service (e.g., a database service), etc.

Some embodiments comprise: means for receiving, at a computer processor of a dependency controller platform, information about an exposed consuming cluster custom dependency; and means for mapping, by the dependency controller platform, the received information to an appropriate external service application programming interface to declaratively streamline dependency consumption.

Some technical advantages of some embodiments disclosed herein are improved systems and methods to provide for the declarative streamlining of dependency consumption in an automatic and efficient manner in such a way so as to provision, consume, de-provision, and/or actively manage and operate the application's dependencies throughout its lifecycle.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
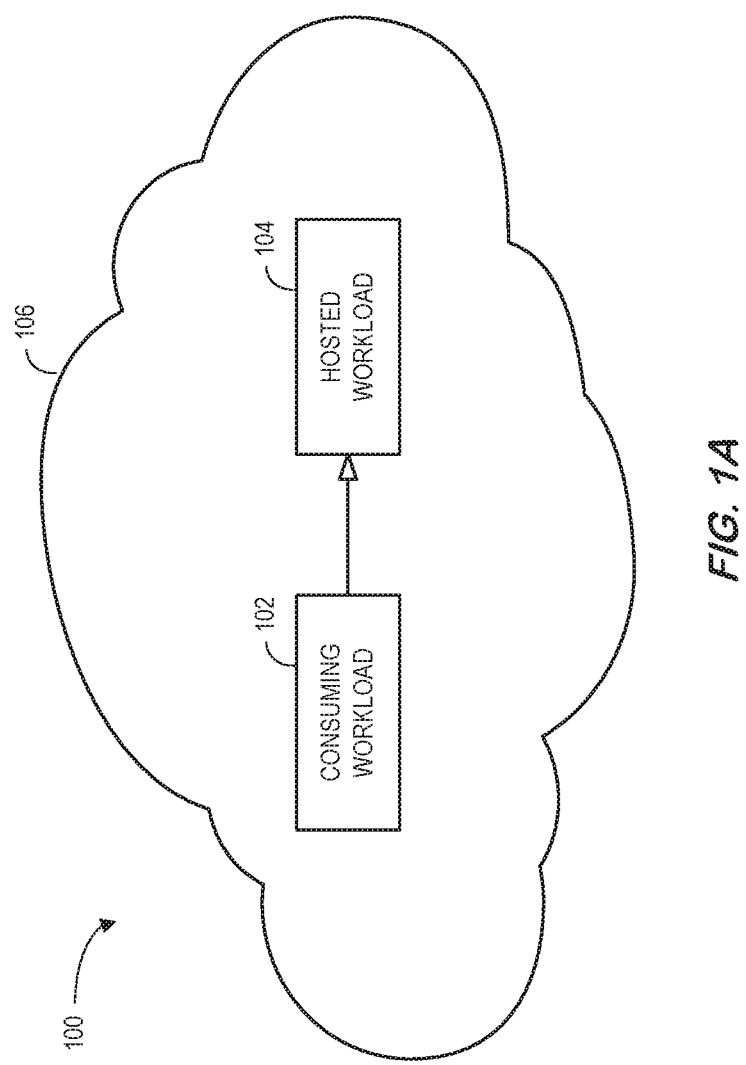
FIGS. 1A through 1D illustrate various dependency setup examples.
Figure 1B:
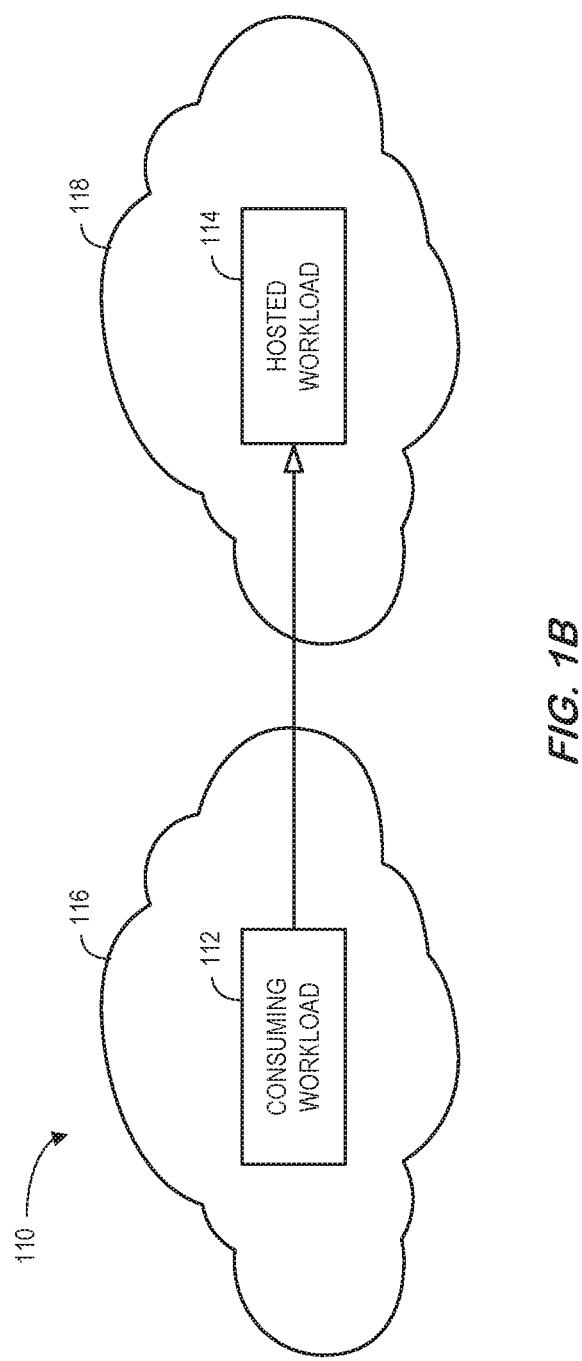
Figure 1C:
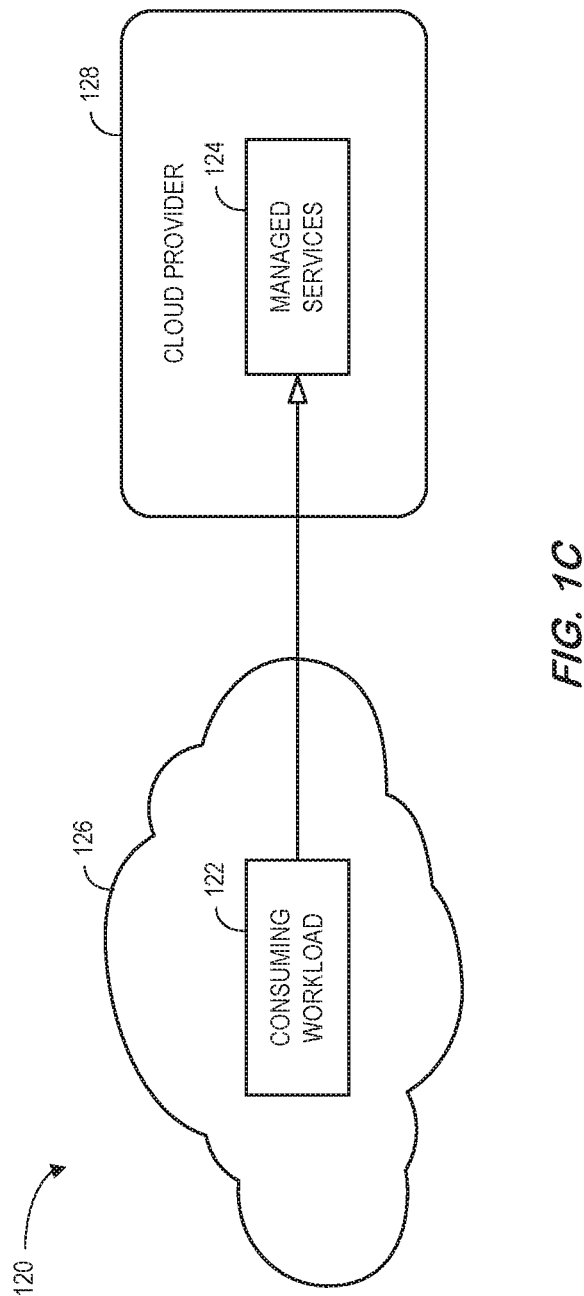
Figure 1D:
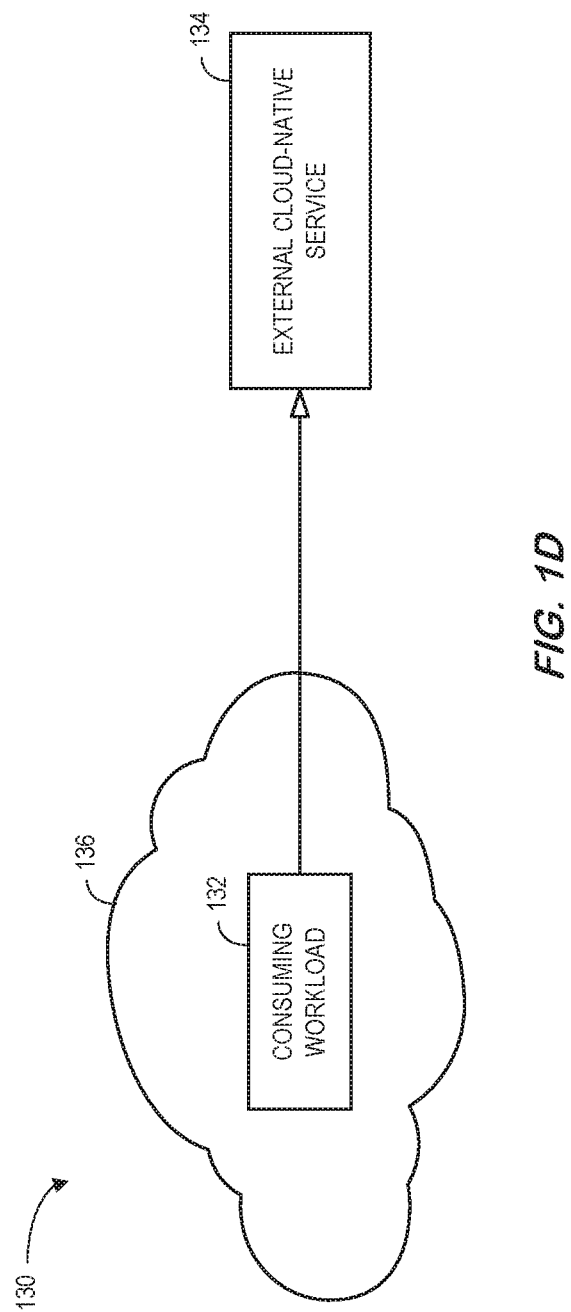

Note that workloads deployed on a container-orchestration system may not always work in isolation. For example, many workloads rely on other services hosted within (or outside) a Kubernetes cluster to perform tasks. Such services can be categorized as illustrated in FIGS. 1A through 1D. In particular, FIG. 1A shows a system 100 setup such that a workload 104 is hosted on the same Kubernetes cluster 106 as a consuming workload 102. FIG. 1B shows a system 110 setup such that a workload 114 is hosted on a different Kubernetes cluster 118 from the cluster 116 hosting a consuming workload 112. FIG. 1C shows a system 120 setup such that managed services 124 are provided natively by a cloud provider 128 external to the cluster 126 of the consuming workload 122. FIG. 1D shows a system 130 setup such that some other kind of external cloud-native service 134 are provided to the cluster 136 of the consuming workload 132.

Solutions about how to consume and/or manage integration throughout the lifecycle of these workloads (as well as the lifecycle of the services) is presently fragmented. For example, workloads to be hosted on the same Kubernetes cluster as a consuming workload are typically provisioned using either Helm charts or using Kubernetes operators. Workloads hosted on a different Kubernetes cluster from the consuming workload may be treated as a generic external cloud-native external service. Managed services provided natively by cloud providers may be managed using the lifecycle Application Programming Interface ("API") of those services. Other kinds of external cloud-native services may also need to be managed using the lifecycle API of those services.

Some embodiments described herein may streamline the way services are consumed by workloads deployed on systems such as those associated with Kubernetes clusters. With respect to existing alternatives, the Open Service Broker API strives to standardize the way services are consumed in a platform-independent way. But this approach has its own limitations. For example, the Open Service Broker API standardizes only a very small subset of the functionality covered by the lifecycle API of services such as:

discovery of the API/capabilities,
provision,
deprovision,
bind for access credentials, and
unbind.

Moreover, the Open Service Broker API does not provide a good way to version the service APIs and capabilities of the service. For example, the functionalities of service offerings and service plans are not suited for this purpose. The Open Service Broker API also does not support services which need to expose multi-level hierarchy of objects in their API or a fine-grained configuration of the service (e.g., service offerings and service plans are crude tools for this purpose). In addition, the Open Service Broker API does not support fine-grained exposure to the status of the services.

Further, the "imperative" nature of the Open Service Broker API does not make for a good native/powerful integration with the "declarative" world such as Kubernetes API and the associated controllers. As used herein, the term "imperative" indicates an approach that uses statements that change a program's state and, in particular, specify "how" a program should achieve a result. In contrast, the term "declarative" indicates an approach that focuses on "what" a program should accomplish (deliberately omitting to specify how the program should achieve that result). The declarative APIs may have some advantages over an imperative API in that it is able to cover the whole lifecycle of the integration between the consuming workload and the consumed service. With a declarative API, the dependency is owned by the consuming side rather than by a broker. This is desirable because the consuming side knows more about the dependency than the broker does. Some embodiments, such as the Kubernetes service catalog somewhat mitigates the mismatch between the imperative Open Service Broker API and the declarative Kubernetes API, but this can only be done by introducing generic resources such as the service instance, service binding, etc. which suffer from all of the disadvantages of such generic structures when compared with the typed structure of the service's native API.

In addition, the Open Service Broker API approach may work only for the services that support service brokers that are compliant with the Open Service Broker API. For the services that do not support service brokers and scenarios for which service brokers are not appropriate (e.g., a cluster-local workload), the fragmentation of approaches continues.

Note that, in addition to standard APIs, Kubernetes supports defining custom declarative APIs in the form of two types of custom resources. The first type of custom resource is a Custom Resource Definition ("CRD") where custom resources are persisted in the cluster's Kubernetes API server. This approach has some limitations but is fit for most use-cases. The second type of custom resource is API server aggregation where the custom resources are persisted in an additional aggregation API server which requires its own storage backend (e.g., etcd). This is more suited for advanced use-cases where the functionality provided by CRDs are inadequate.

As part of the declarative nature of the Kubernetes API, the responsibility for interpreting and taking the necessary action based on the custom resources lies with custom controllers. Kubernetes custom controllers are just regular Kubernetes workloads that use the Kubernetes API to keep track of and take required action on Kubernetes resources (both standard and custom). Combining the Kubernetes custom resources with the Kubernetes custom controllers forms the basis for a Kubernetes operator pattern.

Figure 2:
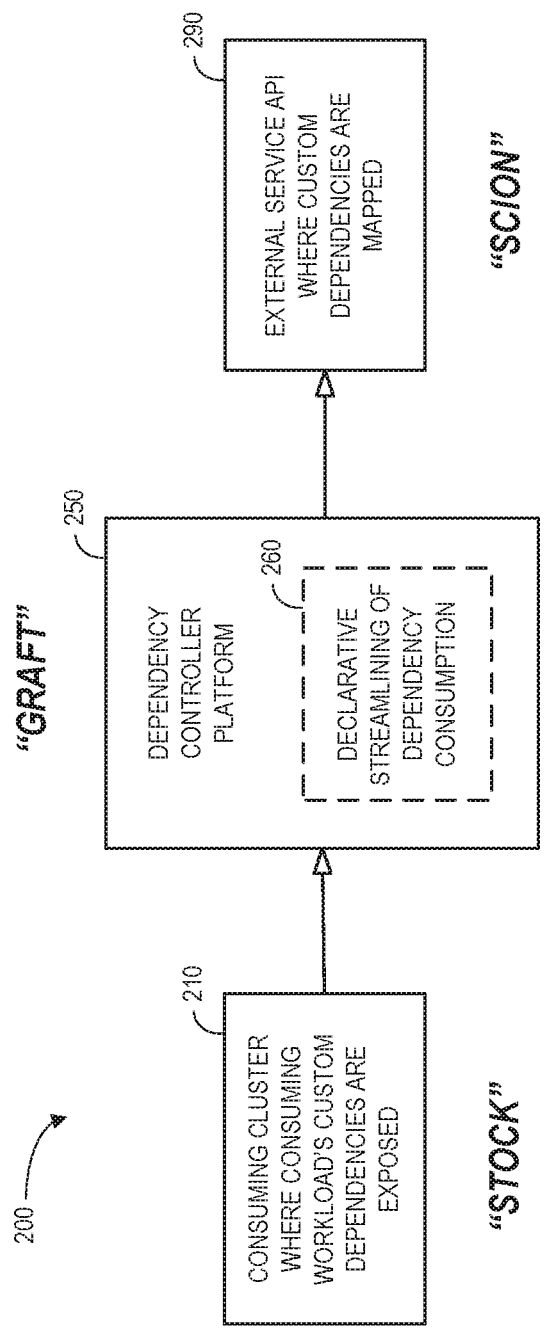
FIG. 2 is a high-level block diagram of a system in accordance with some embodiments.

FIG. 2 is a high-level block diagram of a system 200 in accordance with some embodiments. The system 200 includes a dependency controller platform 250 that may receive information about a consuming cluster 210 where a consuming workload's custom dependencies are exposed and provide information to an external service API 290 where custom dependencies are mapped. Portions of the system might operate automatically or be initiated via a command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The dependency controller platform 250 and/or other elements of the system may store information into and/or retrieve information from various data stores (e.g., data storage devices), which may be locally stored or reside remote from the dependency controller platform 250 and/or the other elements. Although a single dependency controller platform 250 is shown in FIG. 2, any number of such devices may be included. Moreover, various devices described herein might be combined according to embodiments of the present invention. For example, in some embodiments, the dependency controller platform 250 and a database might comprise a single apparatus. The system 200 functions may be performed by a constellation of networked apparatuses, such as in a distributed processing or cloud-based architecture.

A user or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to configure mappings) and/or provide or receive automatically generated recommendations or results from the system 200.

As an analogy, grafting is the act of placing a portion of one plant (bud or "scion") into or on a stem, root, or branch of another ("stock") in such a way that a union will be formed (and the partners will continue to grow). The part of the combination that provides the root is called the stock, and the added piece is called the scion. In the system 200 of FIG. 2, the consuming cluster 210 may be thought of as a stock, the external service API 290 may be thought of as a scion, and the dependency controller platform 250 may be thought of as a graft attaching those two elements.

Figure 3:
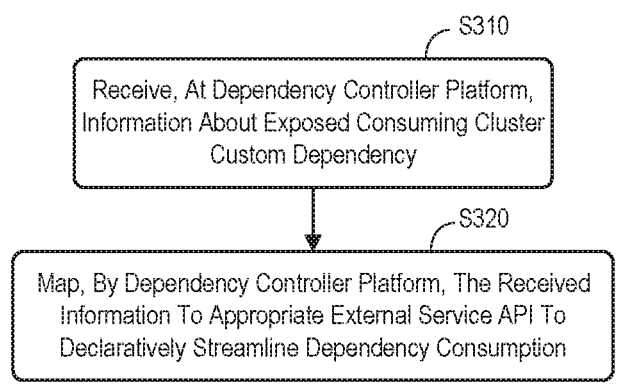
FIG. 3 is a method according to some embodiments.

FIG. 3 is a method that might be performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. The method might be associated with an integration computing environment, such as an integration service or enterprise integration.

At S310, a computer processor of a dependency controller platform may receive information about an exposed consuming cluster custom dependency. At S320, the dependency controller platform may map the received information to an appropriate external service application programming interface to declaratively streamline dependency consumption. Note that the mapping performed at S320 might comprise, in some embodiments, a two-way mapping.

Figure 4:
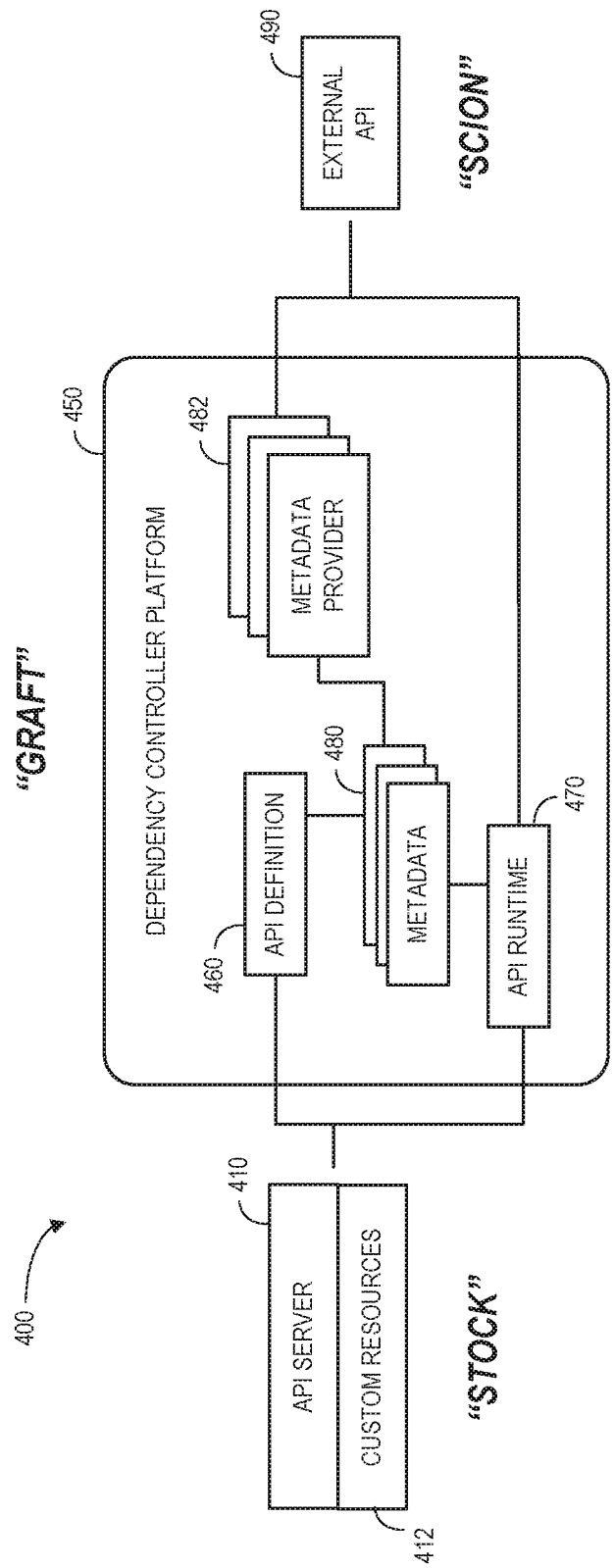
FIG. 4 is a more detailed system architecture in accordance with some embodiments.

Returning to the concept of a graft in the fields of horticulture and surgery, embodiments may be thought of as creating a generic graft component that makes the service's API look like Kubernetes custom resources. Consistent with the nomenclature of grafts in horticulture, the consuming cluster where the Kubernetes custom resources are exposed may be considered the stock and the external service API to which the resources are mapped may be considered the scion. FIG. 4 is a more detailed system 400 architecture in accordance with some embodiments. In this example, the stock comprising an API server and custom resources 412 is attached to the scion external API 490 via a dependency controller platform 450. The dependency controller platform may include an API definition 460 (describing how the system 400 will operate), an API runtime 470 (to make calls as appropriate), a metadata provider 482 (e.g., open API), and metadata 480 (that does the actual mappings).

According to some embodiments, the dependency controller platform 450 may accept the following information as inputs:
the open API definition of the service's native lifecycle API,
a definition of the Kubernetes custom resources 412 (and sub-resources) for the service to act as the Kubernetes API for the service (note that there could be multiple resources per service depending on the granularity of the objects exposed by the service), and
additional metadata 480 to map the actions on the Kubernetes custom resources 412 of the service to the native lifecycle API of the service.

The dependency controller platform 450 may then watch the API server 410 and the Kubernetes custom resources 412 of the services using the Kubernetes API. On different events on the resources, the dependency controller platform 450 may invoke a corresponding native lifecycle API of the service as provided in the mapping as appropriate (e.g., resulting in use of the correct external API 490).

Figure 5:
FIG. 5 illustrates a custom resource for an AMAZON Web Service® ("AWS®") relational database service instance according to some embodiments.
Figure 6:
FIG. 6 illustrates a custom resource for a GOOGLE® Cloud Platform ("GCP") cloud structured query language instance in accordance with some embodiments.

For example, FIG. 5 illustrates 500 a custom resource for an AMAZON Web Service® ("AWS®") Relational Database Service ("RDS") instance (e.g., standard, memory optimized, or burstable performance types of instance) according to some embodiments (e.g., including name and namespace metadata and specifying a version, DB instance class, engine, allocated storage, etc.). Similarly, FIG. 6 is an illustration 600 of a custom resource for a GOOGLE® Cloud Platform ("GCP") Cloud Structured Query Language ("SQL") instance in accordance with some embodiments (e.g., including name and namespace metadata and specifying a project, DB version, settings, etc.).

Figure 7:
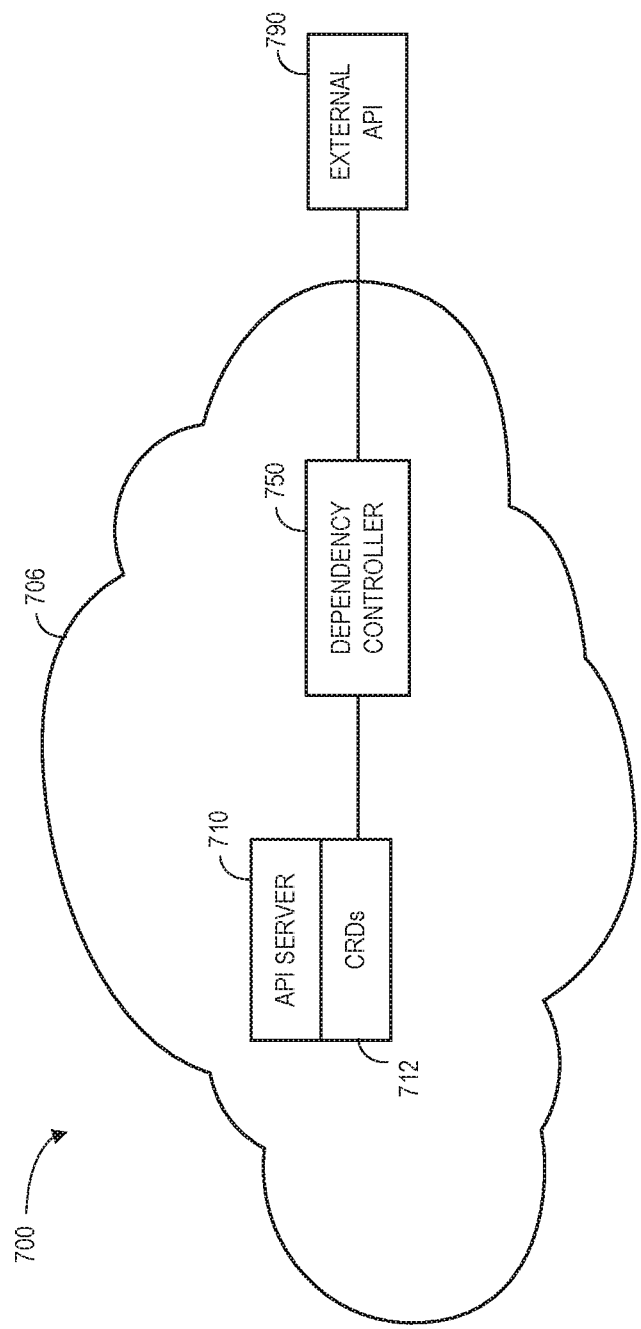
FIG. 7 is a custom resource definitions example according to some embodiments.

Note that embodiments may be associated with different types of "graft" or dependency controller platforms. In one embodiment, in a custom resource definitions variation, the CRDs may be used as the Kubernetes API for the services. For example, FIG. 7 is a custom resource definitions example 700 in which an API server 710 and CRDs 712 in one Kubernetes cluster 706 access a dependency controller 750 within that cluster 706 to access an external API 790. This variation may be suitable for a simple use-case. Note, however, that such an implementation has the disadvantage of requiring a graft or dependency controller 750 to be deployed in the stock cluster 706.

Figure 8:
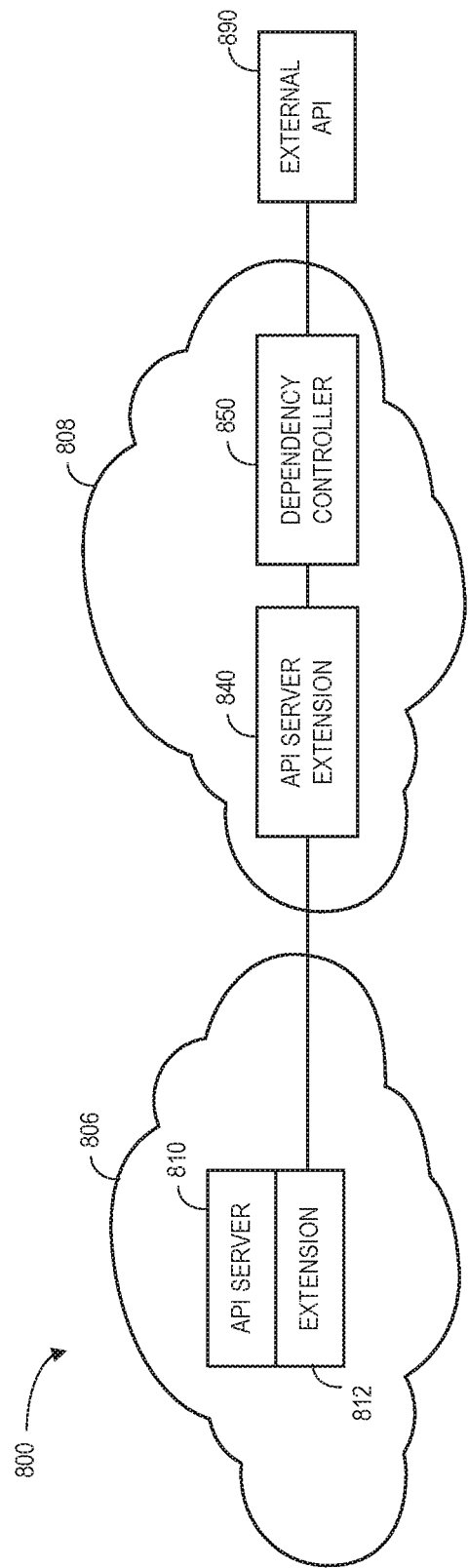
FIG. 8 is a remote application programming interface server extension example in accordance with some embodiments.

Another approach might use a remote API server extension. FIG. 8 is a remote API server extension example 800 in which an API server 810 and extension 812 in one Kubernetes cluster 806 access a dependency controller 850 within another cluster 808, via an API server extension 840, to access an external API 890. In this variation, the remotely hosted API server extension 840 is used as the Kubernetes API for the services. This example 800 has the advantage of requiring no components to be deployed in the consuming cluster 806. However, it comes with the complication of registering the externally hosted API server extension 840 into an existing Kubernetes cluster. There is also the additional complication of hosting for the API server extension 840 and its storage backend.

Figure 9:
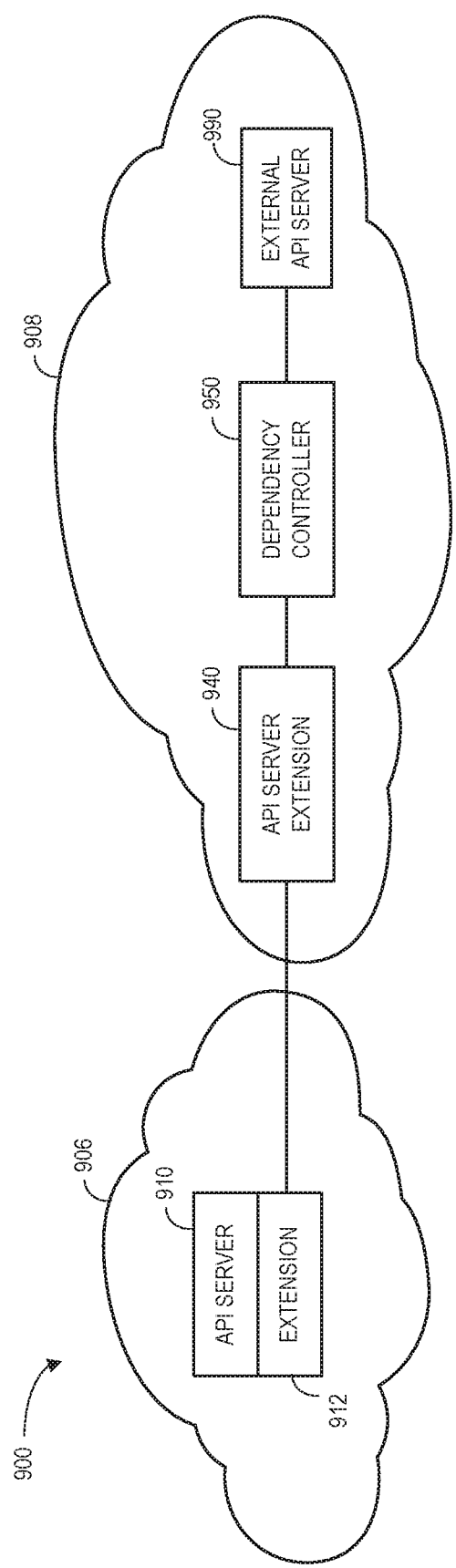
FIG. 9 is a Kubernetes application programming interface server proxy example according to some embodiments.

Still another approach might use a Kubernetes API server proxy. For example, FIG. 9 is a Kubernetes API server proxy example 900 according to some embodiments. Here, an API server 910 and extension 912 in one Kubernetes cluster 906 access a dependency controller 950 within another cluster 908, via an API server extension 940, to access an external API 990 within that other cluster 908. In this variation, the Kubernetes API hosted in an external Kubernetes cluster 908 is exposed as local Kubernetes custom resources in the consuming cluster 906. This example 900 is suitable to expose managed services hosted in external Kubernetes clusters as local Kubernetes Custom Resources in the consuming cluster.

Figure 10:
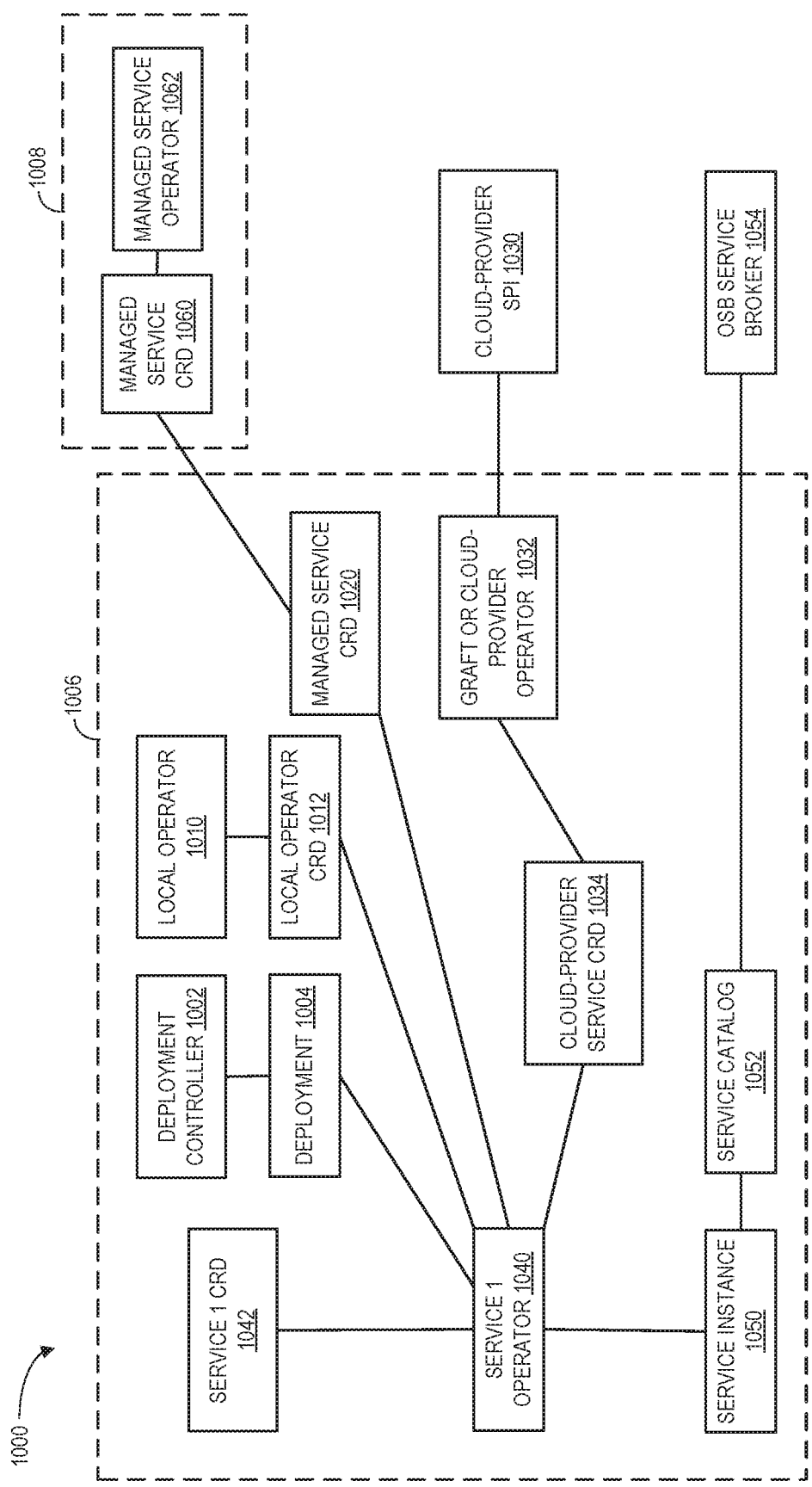
FIG. 10 is a more detailed example of a system in accordance with some embodiments.

An advantage of the graft approach is that consumption of different services from a Kubernetes workload can be streamlined to be consistent with the native declarative mechanism of a Kubernetes API. For example, FIG. 10 is a more detailed example of a system 1000 in accordance with some embodiments. The system 1000 includes a cluster 1006 hosting primarily a service CRD 1042 provisioned and managed by the corresponding service operator 1040. As part of provisioning the service instance according to the service CRD 1042, the service operator 1040 makes use of various kinds of dependencies. To begin with, the service operator 1040 might make use of a deployment controller 1002 (e.g., a standard Kubernetes controller) and associated deployment 1004 to provision actual workload associated with the service instance. The service might have other dependencies apart from the primary workload. For example, a local operator 1010 and local operator CRD 1042 may handle local "first context" information. A managed service CRD 1020 may be associated with a managed service CRD 1060 and managed service operator 1062 in another cluster 1008 (e.g., remote via graft) associated with a second context. A cloud-provider service CRD 1034 may be associated with an external cloud-provider API 1030 via a graft or cloud-provider operator 1032 in connection with a third context. According to some embodiments, a service instance 1050 may also interact with an Open Service Broker ("OSB") 1054 via a service catalog 1052 (e.g., a specialized way to expose information).

The system 1000 shows how all of the different kinds of services listed in a context can be exposed and consumed as local Kubernetes custom resources. The Kubernetes custom resources can therefore provide a typed structure for the Kubernetes API for the service's lifecycle API (which can match the typed structure of the service's native API). Moreover, all of the service's lifecycle functionality can be exposed and consumed. In this way, Kubernetes custom resources can provide a natural and native way to version the service's lifecycle API and capabilities. In addition, the Kubernetes custom resources (along with the concept of sub-resources) may support services which need to expose multi-level hierarchy of objects in their API. Note that service configuration can be as granular as required because the structure of the Kubernetes custom resources is flexible and can track the structure of the service's native API. In this way, the Kubernetes custom resources may specify a best-practice to expose the status of the resources in a status sub-resource which can be tracked to react to changes in status of the service instance.

Figure 11:
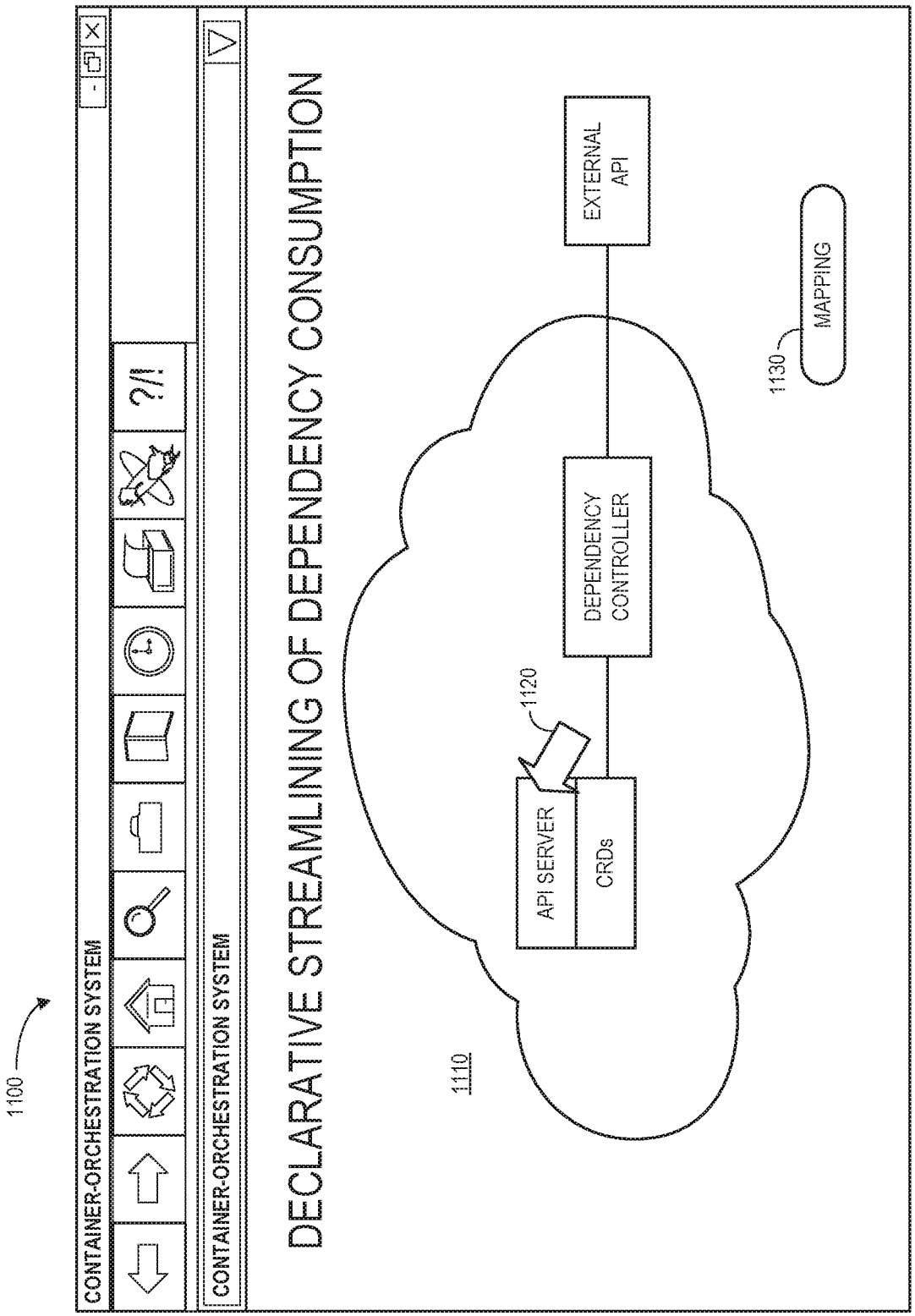
FIG. 11 is a human machine interface display in accordance with some embodiments.

According to some embodiments, an operator or administrator may configure any of the systems described herein as appropriate. For example. FIG. 11 is a human machine interface display 1100 in accordance with some embodiments. The display 1100 includes a graphical representation 1110 of a declarative streamlining of dependency consumption system in accordance with any of the embodiments described herein. Selection of an element on the display 1100 (e.g., via a touchscreen or a computer mouse pointer 1120) may result in display of a pop-up window containing more detailed information about that element and/or various options (e.g., to add mapping information, data about a consuming workload, etc.). In addition, selection of a "Mapping" icon 1130 may let an operator or administrator adjust the operation of the declarative streamlining of dependency consumption system. Note that some or all of the controls and/or interactions described herein might be automated (e.g., system adjustments might be performed in a computer-to-computer fashion).

Figure 12:
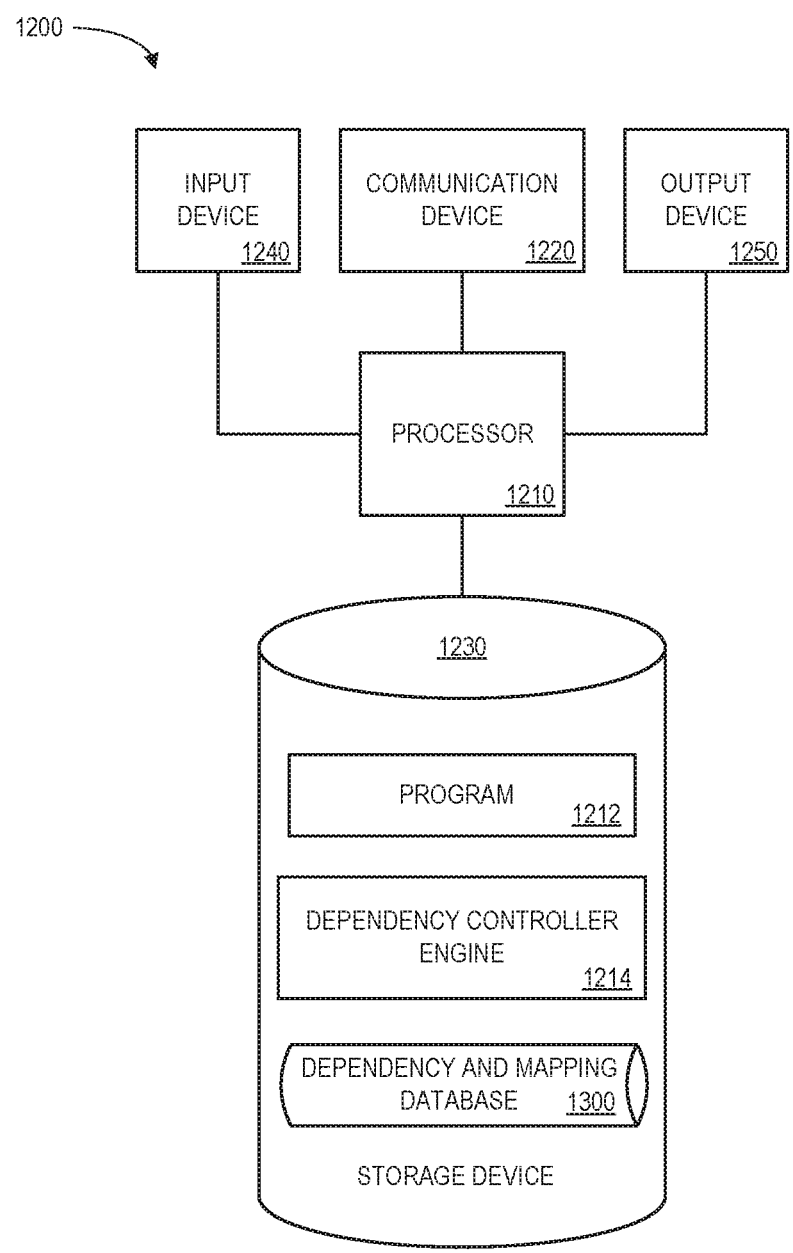
FIG. 12 is an apparatus or platform according to some embodiments.

Note that the embodiments described herein may also be implemented using any number of different hardware configurations. For example, FIG. 12 is a block diagram of an apparatus or platform 1200 that may be, for example, associated with the systems 200, 400, 700, 800, 900, 1000 of FIGS. 2, 4, 7, 8, 9, and 10, respectively (and/or any other system described herein). The platform 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote clusters, administrator platforms, external APIs, etc. The platform 1200 may further include an input device 1240 (e.g., a computer mouse and/or keyboard to input mapping information) and/an output device 1250 (e.g., a computer monitor to render a display, transmit recommendations, and/or create reports about dependency consumption, streamlining, etc.). According to some embodiments, a mobile device, monitoring physical system, and/or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a dependency controller engine 1214 for controlling the processor 1210. The processor 1210 performs instructions of the programs 1212, 1214, and thereby operates in accordance with any of the embodiments described herein. For example, the processor 1210 may be associated with a consuming cluster where custom dependencies are exposed (e.g., a Kubernetes cluster deploying a workload) and an external service application programming interface where the custom dependencies are mapped. The processor 1210 may be located between the consuming cluster and the external service application programming interface. Moreover, the processor 1210 may receive information about an exposed consuming cluster custom dependency. The processor 1210 may then map the received information to the appropriate external service application programming interface to declaratively streamline dependency consumption. Note that the external service application programming interface might be setup in the same Kubernetes cluster, in a workload hosted on a different Kubernetes cluster, as a managed service provided natively by a cloud provider, as an external cloud-native service (e.g., a database service), etc.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a dependency and mapping database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein. For example, the dependency and mapping database 1300 could even be hosted externally to 1230 and might be accessed via the communication device 1220.

Figure 13:
FIG. 13 is portion of a dependency and mapping database in accordance with some embodiments.

Referring to FIG. 13, a table is shown that represents the dependency and mapping database 1300 that may be stored at the platform 1200 according to some embodiments. The table may include, for example, entries associated with dependency consumptions that may be declaratively streamlined in accordance with any of the embodiments described herein. The table may also define fields 1302, 1304, 1306, 1308, 1310 for each of the entries. The fields 1302, 1304, 1306, 1308, 1310 may, according to some embodiments, specify: a dependency identifier 1302, a consuming cluster identifier 1304, an external service API identifier 1306, mapping information 1308, and setup information 1310. The dependency and mapping database 1300 may be created and updated, for example, when a new external service API (or an updated version of an existing service API) is added, mappings or setups are changed, etc.

The dependency identifier 1302 might be a unique alphanumeric label that is associated with a dependency consumption that is to be declaratively streamlined by the system. The consuming cluster identifier 1304 might indicate where custom dependencies are exposed and the external service API identifier 1306 might define an external service API wherein custom dependencies are mapped. The mapping information 1308 may correlate the consuming cluster identifier 1304 with the external service API identifier 1306. The setup information 1310 might indicate, for example, that the external service API identifier 1306 is setup in the same Kubernetes consuming cluster identifier 1304, in a workload hosted on a different Kubernetes cluster, as a managed service provided natively by a cloud provider, as an external cloud-native service (e.g., a database service), etc.

Thus, embodiments may provide for the declarative streamlining of dependency consumption in an automatic and efficient manner in such a way so as to provision, consume, de-provision, and/or actively manage and operate the application's dependencies throughout its lifecycle. Moreover, the declarative nature of the Kubernetes custom resources may provide benefits including an API that covers the whole lifecycle of an integration between the consuming workload and the consumed service with the ability to track the status long after the provision (or any other action) has been performed. Moreover, the dependency may be owned by the consuming side (preferably and operator for the consuming workload) instead of by a broker. This might be desirable, for example, because the consuming side knows more about the dependency as compared to the broker.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A container-orchestration system, comprising:
a consuming Kubernetes cluster, deploying a workload, where custom dependencies are exposed;
a first external service Application Programming Interface ("API") where custom dependencies are mapped, setup in the same consuming Kubernetes cluster;
a second external service API where custom dependencies are mapped, setup in a workload hosted on a Kubernetes cluster other than the consuming Kubernetes cluster;
a third external service API where custom dependencies are mapped, setup as a managed service provided natively by a cloud provider;
a fourth external service API where custom dependencies are mapped, setup as an external cloud-native service; and
a dependency controller platform between the consuming cluster and the external service APIs, including:
an API definition component,
an API runtime component,
a metadata component,
a computer processor, and
computer memory, coupled to the computer processor, storing instructions that, when executed by the computer processor cause the processor to:
(i) receive information about an exposed consuming cluster custom dependency, and
(ii) perform two-way mapping to map the received information to an appropriate external service API to declaratively streamline dependency consumption,
wherein the dependency controller platform accepts the following inputs:
an open API definition of at least one external service's lifecycle API,
a definition of Kubernetes custom resources and sub-resources for that external service to act as a Kubernetes API for that external service, and
additional metadata to map actions on the Kubernetes custom resources of the service to the native lifecycle API of that external service.

2. The system of claim 1, wherein the consuming cluster includes an API server and custom resources.

3. The system of claim 1, wherein custom resource definitions are used as the Kubernetes API for that external service.

4. The system of claim 1, wherein a remotely hosted API server extension is used as the Kubernetes API for that external service.

5. The system of claim 1, wherein a Kubernetes API is hosted in an external Kubernetes cluster and exposed as local Kubernetes custom resources in the consuming cluster.

6. A computer-implemented container-orchestration system method, comprising:
receiving, at a computer processor of a dependency controller platform between a consuming Kubernetes cluster and external service APIs, wherein the dependency controller platform also includes an API definition component, an API runtime component, and a metadata component and receives information about the consuming Kubernetes cluster, deploying a workload, where custom dependencies are exposed;

setting up a first external service Application Programming Interface ("API") where custom dependencies are mapped, in the same consuming Kubernetes cluster;

setting up a second external service API where custom dependencies are mapped, in a workload hosted on a Kubernetes cluster other than the consuming Kubernetes cluster;

setting up a third external service API where custom dependencies are mapped, setup as a managed service provided natively by a cloud provider;

setting up a fourth external service API where custom dependencies are mapped, setup as an external cloud-native service; and performing two-way mapping, by the dependency controller platform, to map the received information to an appropriate external service API to declaratively streamline dependency consumption, wherein the dependency controller platform accepts the following inputs:
an open API definition of at least one external service's lifecycle API,
a definition of Kubernetes custom resources and sub-resources for that external service to act as a Kubernetes API for that external service, and
additional metadata to map actions on the Kubernetes custom resources of the service to the native lifecycle API of that external service.

7. The method of claim 6, wherein the consuming cluster includes an API server and custom resources.

8. The method of claim 6, wherein custom resource definitions are used as the Kubernetes API for that external service.

9. The method of claim 6, wherein a remotely hosted API server extension is used as the Kubernetes API for that external service.

10. The method of claim 6, wherein a Kubernetes API is hosted in an external Kubernetes cluster and exposed as local Kubernetes custom resources in the consuming cluster.

11. A non-transitory, computer-readable medium storing instructions, that, when executed by a processor, cause the processor to perform a method associated with a container-orchestration system, the method comprising:

receiving, at a computer processor of a dependency controller platform between a consuming Kubernetes cluster and external service APIs, wherein the dependency controller platform also includes an API definition component, an API runtime component, and a metadata component and receives information about the consuming Kubernetes cluster, deploying a workload, where custom dependencies are exposed;

setting up a first external service Application Programming Interface ("API") where custom dependencies are mapped, in the same consuming Kubernetes cluster;

setting up a second external service API where custom dependencies are mapped, in a workload hosted on a Kubernetes cluster other than the consuming Kubernetes cluster;

setting up a third external service API where custom dependencies are mapped, as a managed service provided natively by a cloud provider;

setting up a fourth external service API where custom dependencies are mapped, setup as an external cloud-native service; and performing two-way mapping, by the dependency controller platform, to map the received information to an appropriate external service API to declaratively streamline dependency consumption, wherein the dependency controller platform accepts the following inputs:
an open API definition of at least one external service's lifecycle API,
a definition of Kubernetes custom resources and sub-resources for that external service to act as a Kubernetes API for that external service, and
additional metadata to map actions on the Kubernetes custom resources of the service to the native lifecycle API of that external service.

12. The medium of claim 11, wherein the consuming Kubernetes cluster includes an API server and custom resources.

* * * * *